HERCY E. TOWER.
Improvement in Baskets.
No. 124,231.
Patented March 5, 1872.
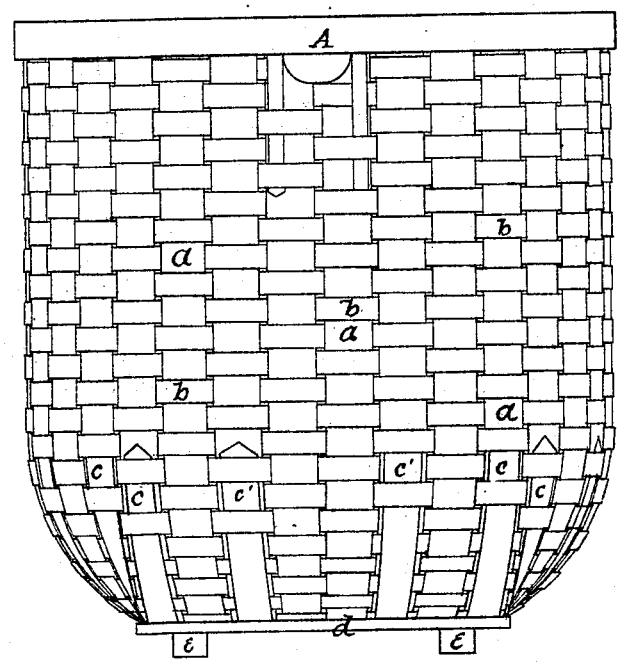
FIG. I.
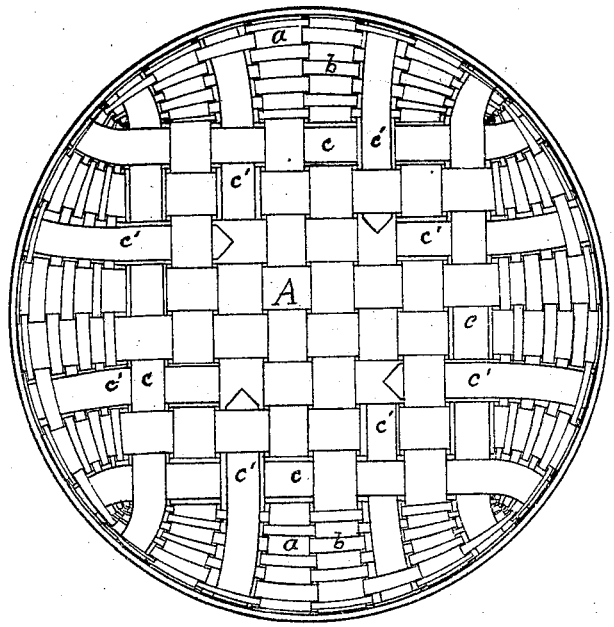
FIG. II.
WITNESSES:
Jno. F. Sedgwick
C. W. Mulell
INVENTOR:
Hercy E. Tower.
By Sidney Sanders, atty

UNITED STATES PATENT OFFICE.

HERCY E. TOWER, OF WORTHINGTON, MASSACHUSETTS.

IMPROVEMENT IN BASKETS.

Specification forming part of Letters Patent No. 124,231, dated March 5, 1872.

SPECIFICATION.

I, HERCY E. TOWER, of Worthington, Hampshire county, Massachusetts, have invented an Improved Basket, of which the following is a specification:

My invention consists in providing the bottom and sides of a basket with metallic "taps;" and, further, in providing the same with such taps and a supplementary bottom, in the manner hereinafter described, the object thereof being to protect the most exposed parts of the basket from external injury and destruction, and, further, to prevent the bottom's sagging and drawing the basket out of shape when heavily loaded.

In the accompanying drawing making a part of this specification, Figure 1 is a side elevation of my improved basket with the supplementary bottom; and Fig. 2, a plan of the same turned bottom upward without the supplementary bottom.

A designates the basket proper; $a\ a$, the standards; $b\ b$, the filling; $c\ c'$, the metallic taps; $d$, the supplementary bottom; and $e\ e$, stays or cross-bars. The standards $a\ a$ I make of any species of suitable wood, prepared and woven in the ordinary manner. The taps $c\ c'$ I make of any suitable species of sheet metal, preferably of galvanized iron; such taps being simply strips of sheet metal of proper length and breadth, and differing from one another only in that the outside or corner tap $c$ is the longer of the two, and extends quite across the bottom and part way up the sides of the basket, while the intermediate or side tap $c'$ is shorter, and terminates on the bottom of the basket, as shown in Fig. 2; but all long or all short taps may be used, the ends thereof being confined between the standard and filling, and intermediate portions at the lower corner of the basket covering both standards and filling externally. The supplementary bottom $d$ I make of wood, corresponding generally in size and outline with the bottom of the basket, to which it is confined by rivets or other suitable means; and for the best effect I provide the supplementary bottom with stays or cross-bars $e\ e$; but such stays may be entirely dispensed with.

The metallic taps obviously protect those parts of the basket most exposed to external injury and destruction; the supplementary bottom conduces to the same effect, and, further, serves to preserve the form of the basket by keeping the bottom thereof from sagging.

The stays $e\ e$ facilitate the use of a much lighter supplementary bottom than would otherwise be practicable, and render the shoving and sliding of the basket along a floor comparatively easy.

What I claim as my invention is—

1. The basket A, provided with the metallic taps $c\ c'$, arranged and combined with the standards $a\ a$ and filling $b\ b$ as specified; and 2. The basket A, provided with the metallic taps $c\ c'$ and supplementary bottom $d$, as specified.

HERCY E. TOWER.

Witnesses:
   DANIEL WARD,
   EDWARD BARTLETT.